United States Patent [19]

Thorndike

[11] Patent Number: 4,637,769

[45] Date of Patent: Jan. 20, 1987

[54] LOG CARRIER

[76] Inventor: Charles E. Thorndike, P.O. Box 446, Meredith, N.H. 03253

[21] Appl. No.: 698,110

[22] Filed: Feb. 4, 1985

[51] Int. Cl.$^4$ ............................................. B65G 7/12
[52] U.S. Cl. .................................... 414/454; 294/17; 294/104; 414/704; 414/911
[58] Field of Search ............... 414/444, 450, 453, 454, 414/455, 456, 490, 622, 704, 721, 911; 294/11, 16, 17, 104, 82.1

[56] References Cited

U.S. PATENT DOCUMENTS

Re. 2,804 11/1867 Humes .................................. 414/453
70,303 10/1867 Whipple ............................. 414/453

Primary Examiner—Robert J. Spar
Assistant Examiner—Stuart J. Millman
Attorney, Agent, or Firm—Cesari and McKenna

[57] ABSTRACT

A carrier for lifting and transporting a log. The carrier includes a wheeled frame, a hook, and a load stabilizer. The hook has, at one end, a hinged attachment to the frame, and, at the other end, both a point for gripping one side of the log and a point for prodding logs into position. The load stabilizer is movably attached to the frame. After a log is initially gripped between the hook and the frame, the stabilizer is moved into a position in which the stabilizer applies a force to the log to hold the log against the hook and thereby prevent the hook from losing its grip on the log.

11 Claims, 6 Drawing Figures

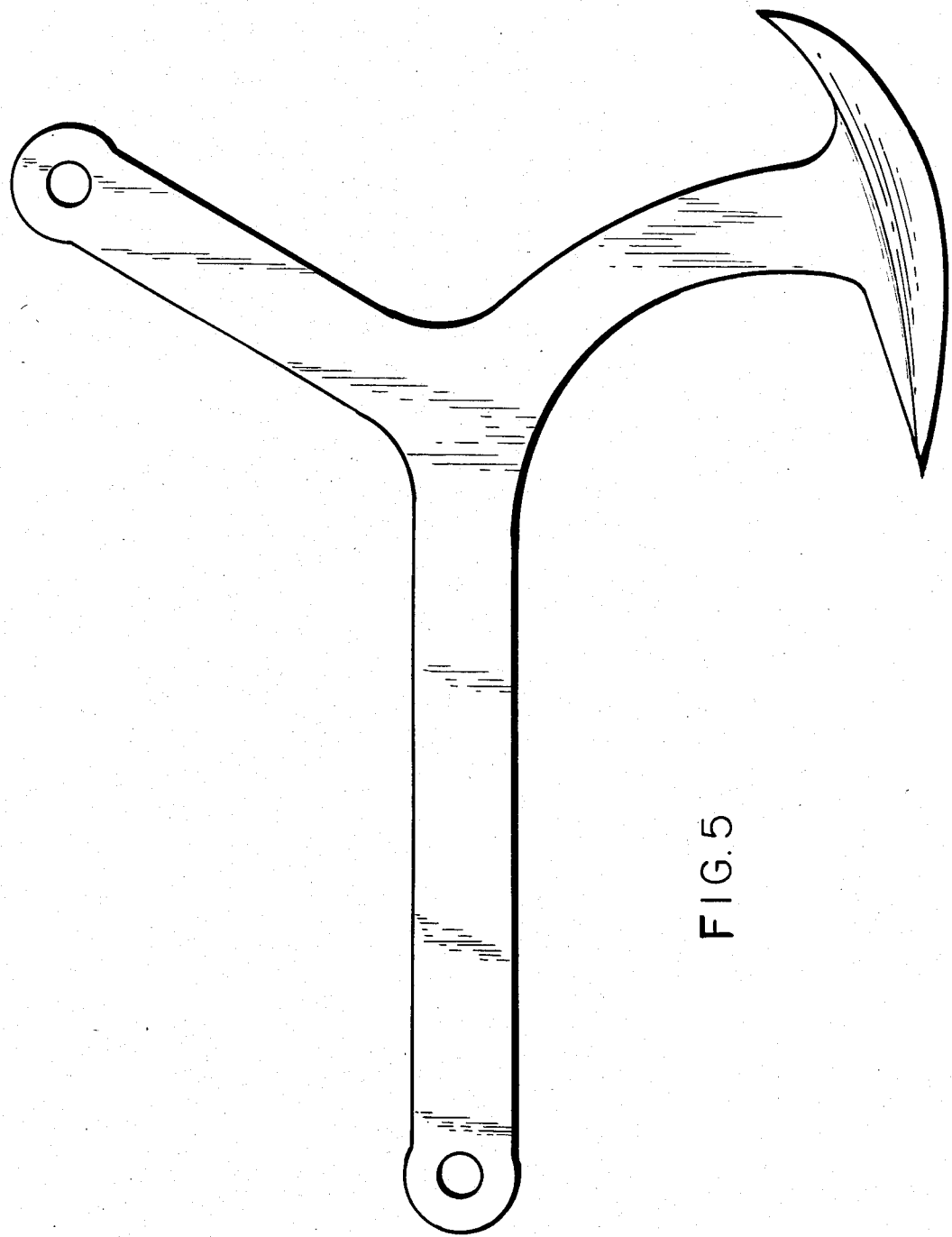

LOG CARRIER

FIELD OF THE INVENTION

The invention relates to apparatus for carrying loads, in particular to hand trucks for lifting and transporting logs.

BACKGROUND OF THE INVENTION

A peavey is a device comprising a long pole and a hook with a sharp point and with a hinged attachment to the pole. A peavey is useful for rolling logs and thus moving them short distances. When the pole is further fitted with a protruding foot that functions as a fulcrum between the peavey and the ground, a peavey can also be used to lift one end of a log, as may be useful when cutting logs. Once lifted however, the peavey provides no mechanism for transporting the log.

Hand trucks have been adapted in various ways to facilitate the carrying of various types of loads. In particular, U.S. Pat. Nos. 70,303 and Re. 2,804 each show a hand truck fitted with a hinged hook similar to that of a peavey in order to assist in holding a barrel or bale on the hand truck. A problem with the type of carrier shown in these patents is that the grip of the hook on the load is readily lost if the carrier moves over uneven terrain or is tilted too far foward (tilted such that the load rolls towards the hinge). This is because the load must be constantly forced toward the hook's point in order to maintain the hook's bite on the load.

On the carriers shown in these patents, the undresirable effect of this loss of grip is reduced somewhat by the presence of the extended heel at the bottom of the carrier. The heel helps to maintain the load on the carrier since, if the heel is long enough and the carrier is tilted forward enough, the center of gravity of the load will be above a point between the tip of the heel and the handle of the carrier; thus the load will rest on the carrier rather than rolling off. However, even though the load may not fall off immediately, once the grip of the hook is lost the load can thereafter bounce on the carrier as it moves over uneven terrain, possibly jumping over the heel and off the carrier. The mitigating effect is obtained only either if a long heel is used, which may be difficult to get under the load, or if the carrier is tilted through a large angle. Further, the optimum size of such heel (long enough to provide the required support, but as short as possible to reduce the problem of getting the heel under the load) depends on the diameter of the load to be carried. Thus, this arrangement is unsuitable for carrying loads of widely varying sizes.

It is desirable to provide a carrier capable of maintaining a grip on a load when the carrier transports the load over uneven terrain, and further, it is desirable to provide a mechanism capable of maintaining such a grip on a wide range of load sizes.

SUMMARY OF THE INVENTION

A carrying apparatus includes a wheeled frame for supporting and transporting a load. A hook has, at one end, a hinged attachment to the back of the frame, and, at the other end, a point for gripping the load. The hook is used to grip one side of the load while the other side of the load rests against the frame so that the load can be lifted and held in position while being transported. A load stabilizer is movably attached to the frame for assisting in maintaining the hook's grip on the load.

The carrier is operated by positioning the carrier so that the load is between the frame and the grip point of the hook, pivoting the carrier forward so as to grip and raise the load, and moving the load stabilizer into contact with the load.

The stabilizer is arranged to apply a force against the load so as to hold the load against the hook's grip point and thereby prevent the hook from losing its grip on the load. In one embodiment the stabilizer is a wedge which is lowered into the gap between the top of the load and the carrier frame, thereby applying a force on the load in a generally rearward and downward direction. The action of the load stabilizer is particulary important when transporting the load over uneven terrain.

The hook includes a release arm attached to a tether. The tether can be pulled to raise the hook, either to release a log or when positioning a log between the hook and the rest of the carrier. The hook also includes a prod point that is located near the grip point, but is pointed away from the carrier frame. When the hook rests against the carrier, the prod point can be used to prod logs into position. The lower side of the prod point also provides a skid surface which runs between the prod point and the trip point. When approaching a log with the carrier, this surface causes the hook to slide over the log, thus eliminating the need in many cases for manually raising the hook.

BRIEF DESCRIPTION OF THE DRAWING

The invention is pointed out with particularity in the appended claims. The above and other advantages of the invention may be better understood by referring to the following detailed description in conjunction with the drawings in which:

FIG. 5 is a side view of the carrier of FIG. 1 positioned to lift a large diameter log; and FIG. 6 shows a portion of a carrier with a pivot-type load stabilizer.

DESCRIPTION OF AN ILLUSTRATIVE EMBODIMENT

Figure 1:
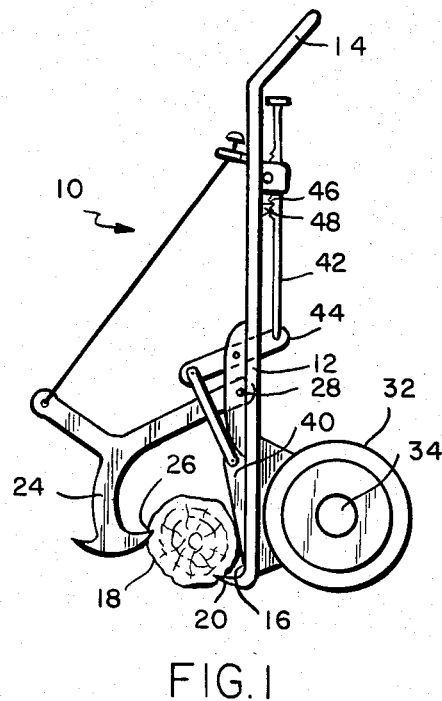
FIG. 1 is a side view of a carrier in accordance with the present invention positioned to lift a small diameter log.
Figure 2:
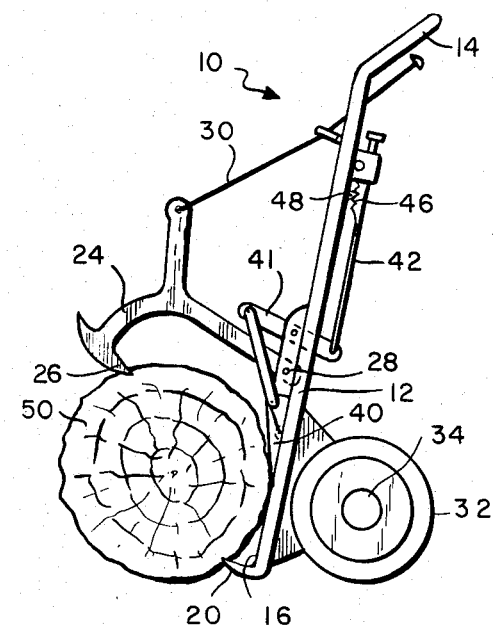
FIG. 2 is a perspective view of the carrier of FIG. 1.

An illustrative carrier is shown in FIGS. 1 and 2. The carrier 10 has a frame 12 which includes at its upward end a handle 14 which a user can grasp to push, pull, or pivot the carrier. At the lower end of the frame 12 is a support surface 16 which provides both rearward and upward forces on a log 18. At the bottom of the surface 16 is a heel 20; the heel 20 may be in the form of a continuous ledge or a row of separate projections. In addition to or as an alternative to the heel 20, there may be a plurality of projections on the surface 16 which dig into the log 18, or other means for providing friction between the surface 16 and the log 18.

If it is desired to carry loads other than logs, the gripping characteristics of the support surface 16 can be modified accordingly. For example, to carry rocks, a larger heel may be used, and both the heel and the rest of the support surface 16 may be covered with a material such as rubber which will resist the slipping of the rock.

Figure 3:
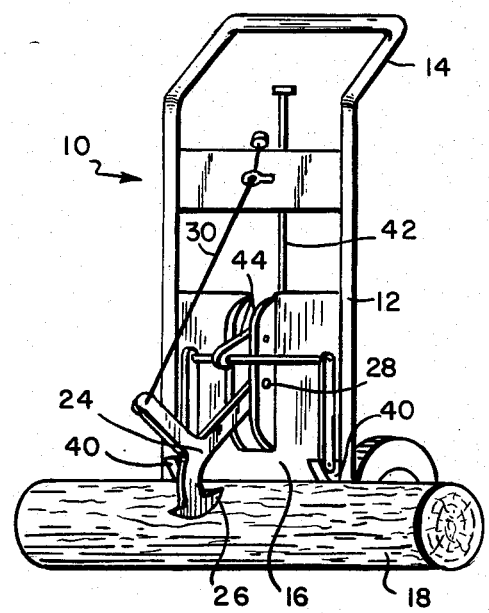
FIG. 3 is a side view of the hook of the FIG. 1 carrier.
Figure 4:
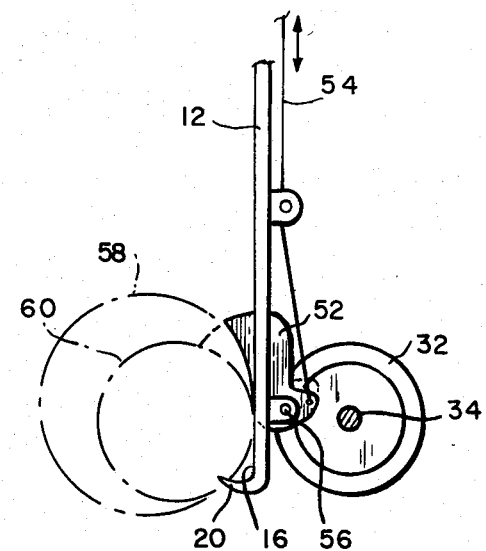
FIG. 4 is an end view of the hook of the FIG. 1 carrier.

A hook 24, shown in greater detail in FIGS. 3 and 4, has an end adapted for gripping a load. In the embodiment shown in the figures, this is a grip point 26 for use with logs. In an alternative embodiment, a rubber pad can be substituted for the point 26; this provides a grip more suitable for rocks. The other end of the hook 24 has a hinged attachment 28 to the frame 12. Gravity acts on the hook 24 to cause it to swing downward and forward toward the support surface 16 of the frame 12. The hook 24 is attached via a release arm 29 to a tether 30 that extends up to the region of the handle 14. By pulling on the tether 30 a user of the carrier can counteract the force of gravity on the hook 24 and move the hook upward and away from the support surface 16. Pointing in the opposite direction from the grip point 26 is a prod point 31. When the hook 24 is resting against the support surface 16, the carrier 10 can be manipulated to use the prod point 31 to position logs. The prod point also provides a skid surface 32 that helps the hook 24 slide over a log when first approaching a log to be lifted.

A wheel assembly includes a pair of wheels 33 (only one of which is visible in FIG. 1), an axle 34, and mounting members 36 for attaching the wheel assembly to the frame 12. A wheel assembly with four wheels and two axles can also be used. With a single axle, the axle provides an axis about which the carrier 10 can be easily pivoted; when built using multiple axles, the attachment between the wheel assembly and the frame 12 is preferably hinged, allowing all the wheels to remain on the ground while the frame 12 is pivoted. Alternatively, the forwardmost wheels may be used only after the frame 12 has been pivoted; in this case the wheel assembly would be used to roll the carrier 10 at a fixed pivot angle. A multi-axle wheel assembly can be further modified by the addition of a continuous belt or tread; a treaded assembly may be useful in transporting a load over soft or very uneven terrain.

A pair of stabilizing wedges 40 are attached to a control linkage 42. The control linkage 42 enables a user of the carrier to move the stabilizing wedges 40 upward or downward. The linkage 42 includes a pivot bar 44 which tranforms an upward pull at the user's end of the linkage 42 into a downward push on the stabilizing wedges 40.

A rachet mechanism comprises notches 46 on the linkage 42 and a notch 48 on the frame 12. The rachet mechanism enables the user of the carrier to force the wedge into place between the log 18 and the support surface 16 and to retain the wedge in this position without continued effort on part of the user.

Numerous alternative mechanisms can be used for allowing the user to move the stabilizers and for holding the stabilizers in position.

A user of the carrier 10 can, through manipulation of the handle 14, tether 30, and control linkage 42, lift and transport a log. When approaching a log 18, the carrier 10 is typically tilted forward. Once the carrier comes in contact with or nearly in contact with the log, the user braces the carrier from moving forward (i.e, by placing a foot against the axle 34 or other suitable portions of the wheel assembly) and rotates the carrier to the upright position. During this rotating motion, the hook 24 slides over the top of the log 18 and comes to rest with the grip point 26 against the log. The skid surface 32 formed by one side of the prod point 31 and one side of the grip point 26 facilitates the movement of the hook 24 over the top of the log 18. The angle of this surface 32 is such that as the carrier 10 approaches the log 18, the hook 24 is pushed upward.

For particularly large logs, the tilt of the carrier 10 may not elevate the hook 24 enough to enable the hook to slide over the log as the carrier is moved against the log. In this case, the hook is raised before approaching the log by pulling on the tether 30.

Once the log 18 is between the hook 24 and the support surface 16, the carrier 10 is pivoted forward by again bracing carrier by, for example, a foot against the axle and pulling the handle 14 of the carrier forward and slightly downward. This pivoting secures the log 18 in a grip between the hook 24 and the support surface 16, and lifts the log 18. The upper end of the control linkage 42 is pulled upward, forcing the stabilzing wedges 40 into the V-shaped space between the log 18 and the support surface 16. The rachet mechanism, including parts 46 and 48, locks the control linkage 42, thereby holding the stabilizing wedges 40 in place. Alternatively, the stabilizing wedges 40 can be positioned prior to lifting the log.

At this point the log 18 can be transported by rolling the carrier 10 forward or backward. Also, the carrier 10 may be further pivoted, so as to position the weight of the log approximately over the axle 34.

The log 18 can be released by pivoting the carrier 10 so that the log 18 rests on the ground. In many cases, when the log 18 hits the ground, the hook's purchase on the log 18 will be lost and the carrier can then be tilted forward and rolled away from the log 18. In other cases, particularly with logs having a very rough bark, the hook 24 will grip the log 18 when the carrier is pulled away; in these cases the grip on the log 18 is released by by pulling the tether 30, thereby raising the hook 24 away from the log 18.

When the hook 24 is against the carrying surface 16, the prod point 31 can be used to position logs, for example, to adjust the position of a log after it has been released by the carrier, or to roll or shift a log into a better position in prepartion for lifting the log with the carrier.

While being lifted and transported, forces are applied to the log 18 in several directions by various parts of the carrier 10. These forces act in conjunction with the force of gravity upon the log 18 to provide a secure grip. When the carrier to raise the log, the force of the log on the grip point 26 causes the point to cleave to the log; this applies a forward and upward force on the log 18 and prevents the log 18 from rotating in the counterclockwise direction (as viewed in FIG. 1). The friction provided by the support surface 16 and the heel 20 enables the surface 16 to provide a rearward and upward force on the log 18 and to prevent the log 18 from rotating in the clockwise direction. These forces result in the log 18 being gripped between the hook 24 and the support surface 16 such that when the carrier 10 is pivoted about the axle 34 the log 18 is lifted.

At this point, gravity plays an important role in maintaining the grip on the log 18. Gravity applies a downward force on the log 18 which tends to hold the log 18 against the grip point 26 and hold the hook 24 in position, This can be seen by examining two ways in which the beneficial effect of gravity can be defeated.

If the carrier 10 is pivoted forward 90°, there is no longer any force to hold the log 18 at the bottom of the carrier 10; the log is free to roll toward the handle 14 of the carrier. This results from the fact that the hook 24, unlike the support surface 16, cannot apply a force on the log 18 in the direction away from the handle 14 because the hook's hinged attachment 28 permits upward motion of the hook 24.

The effect of gravity on the log 18 can also be defeated during the transporting of the log 18 over uneven terrain. As the carrier 10 is rolled over bumps in the terrain, the log 18 can be abruptly raised and dropped. During such jostling of the log 18, the log 18 may move upward relative to the carrier, causing the grip point 26 of hook 24 to lose its grip on the surface of the log 18. Mere resting of the grip point 26 on the surface of the log 18 may not be enough to enable the point 26 to regain sufficient purchase on the log to prevent the log from rolling counterclockwise and falling off the bottom of the carrier 10.

Thus, while transporting a log, gravity does not always provide the force necessary to maintain a secure grip on the log 18 between the hook 24 and the support surface 16. The stabilizing wedges 40 are provided to overcome this problem. The stabilizing wedges 40 provide a rearward and downward force on the log 18. This force prevents the log from moving in the direction of the handle 14 and thereby releasing the hook's purchase on the log 18. Thus, the stabilizing wedges 40 enable the carrier 10 to maintain a secure grip on the log 18 in situations when the grip would be lost without the stabilzing wedges 40.

FIG. 5 shows the same carrier 10 as shown in FIG. 1, but positioned to lift a log 50, which is of larger diameter than the log 18 shown in FIG. 1. As is illustrated in FIG. 5, the hook 24 provides sufficient grip to lift the log 50, even though the grip point 26 of the hook 24 does not reach to the lower portion of the log 50. Further, in order to position the carrier 10 so that the heel 20 contacts the log 50, the carrier 10 in FIG. 5 is positioned at a different angle than the carrier 10 shown in FIG. 1. With a carrier according to the present invention, a heel 20 of fixed size can be used with logs of widely varying diameters. As mentioned above, the contact between the heel 20 and the load helps prevent the load from rotating clockwise. If the support surface 16 provides sufficient friction between it and the log 50, then the heel 20 is not required. The carrier can be used, not only for logs of widely varying diameters, but also for logs of widely varying lengths. For example, the carrier is useful both for manipulating logs of the 6 to 14 foot lengths typically found in millyards and for manipulating much shorter logs used for firewood.

FIG. 6 shows a pivot-type load stabilizer 52 which can be used as an alternative to the stabilizing wedges 40 discussed above. The stabilizer 52 is attached to a control linkage 54 by which the user can cause the stabilizer 52 to pivot around a pivot point 56 and thereby move out through a slot in the carrying surface to contact a large log 58 or a smaller log 60.

The foregoing description has been limited to a specific embodiment of this invention. Additional advantages and modifications will be apparent to those skilled in the art. The invention is, therefore, not limited to the specific details, representative apparatus, and illustrative example shown and described in this specification. It is the object of the appended claims to cover all such variations and modifications as come within the true spirit and scope of the invention.

What is claimed as new and desired to be secured by letters patent of the United States is:

1. A carrying apparatus for lifting and transporting a load comprising:
   (A) a frame having a handle extending upwards, and a support surface on one face of the frame upon which the load is held;
   (B) a wheel assembly attached at one end of the frame for transporting the carrier and the load;
   (C) a hook having at one end a seizing means directed towards said support surface, and at an opposite end a hinged attachment to the frame at a point above the support surface such that the hook can swing generally away from the support surface and upward; and
   (D) a load stabilizer movably attached to the frame for applying a force on the load generally downward and outward from said support surface, so that said load is securely restrained by said hook seizing means.

2. The carrying apparatus of claim 1 wherein the stabilizer is a wedge that is positioned to apply force by sliding the wedge down between the load and the support surface.

3. The carrying apparatus of claim 1 wherein the stabilizer pivots outward from the support surface.

4. The carrying apparatus of claim 1 wherein the wheel assembly includes a pivot axis about which the carrier can be pivoted to lift the load.

5. The carrying apparatus of claim 1 wherein said load stabilizer is a pair of wedges located on the carrying surface and arranged to slide up and down the carrying surface and a control member positioned near said handle and a linkage connecting said control member and said pair of wedges for positioning said stabilizer.

6. The carrying apparatus of claim 5 further including means for holding said load stabilizer in contact with the load.

7. A hook for use with a log carrier comprising:
   (A) an elongated, hook-shaped member having at one end means for hinged attachment to the log carrier and at the other end a grip point and a prod point, the two points being directed in opposite directions, the grip point being directed generally towards the means for hinged attachment, there being a skid surface between the two points, and
   (B) a release arm projecting from the hook-shaped member in a direction generally perpendicular to and away from a straight line between the means for hinged attachment and the grip point, and at its outwardmost end having means for attachment to a tether.

8. Carrying apparatus for lifting and transporting a load comprising:
   (A) a frame having a handle extending upwards, and a support surface on one face of the frame,
   (B) a wheel assembly attached at one end of the frame for transporting the carrier and the load,
   (C) a hook comprising:
      (1) an elongaged, hook-shaped member having at one end means for hinged attachment to the log carrier and at the other end a grip point directed generally toward the support surface and a prod point directed generally away from the support surface, there being a skid surface extending between the two points, and
      (2) a release arm projecting from the hook-shaped member in a direction generally perpendicular to and away from a straight line between the means for hinged attachment and the grip point, and at its outwardmost end having means for attachment to a tether, said hook being attached to the frame at a point above the support surface such that the hook can swing generally away from the carrying surface and upward.

9. The carrying apparatus of claim 8 further comprising a load stabilizer movably attached to the frame for applying force on the load generally downward and away from the support surface.

10. The carrying apparatus of claim 1 wherein said apparatus is adapted for carrying a log upon said support surface.

11. The carrying apparatus of claim 10 wherein said hook seizing means is a grip point directed towards said support surface so as to cleave to the log and restrain the log upon said support surface.

* * * * *